(12) United States Patent
Yoon et al.

(10) Patent No.: US 10,174,835 B2
(45) Date of Patent: Jan. 8, 2019

(54) METHOD OF DIAGNOSING MALFUNCTION IN DUAL CLUTCH TRANSMISSION

(71) Applicants: Hyundai Motor Company, Seoul (KR); Kia Motors Corporation, Seoul (KR)

(72) Inventors: Young Min Yoon, Suwon-si (KR); Seung Sam Baek, Jeju-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/714,895

(22) Filed: Sep. 25, 2017

(65) Prior Publication Data

US 2018/0010686 A1 Jan. 11, 2018

Related U.S. Application Data

(63) Continuation-in-part of application No. 14/717,223, filed on May 20, 2015, now abandoned.

(30) Foreign Application Priority Data

Nov. 19, 2014 (KR) .................. 10-2014-0161318

(51) Int. Cl.
   *F16H 61/12* (2010.01)
   *F16H 61/688* (2006.01)
   *F16H 61/00* (2006.01)

(52) U.S. Cl.
   CPC .......... *F16H 61/12* (2013.01); *F16H 61/688* (2013.01); *F16H 2061/009* (2013.01);
   (Continued)

(58) Field of Classification Search
   CPC ................. F16H 61/688; F16H 61/12; F16H 2061/1272; F16H 2061/009; F16H 2061/1284
   See application file for complete search history.

(56) References Cited

U.S. PATENT DOCUMENTS

2006/0089231 A1* 4/2006 Schweizer ............. F16H 61/12
                                                        477/34
2007/0298932 A1* 12/2007 Yoneyama ............. F16H 61/12
                                                        477/120
(Continued)

FOREIGN PATENT DOCUMENTS

JP          11-180182 A     7/1999
JP         2008-528892 A    7/2008
(Continued)

*Primary Examiner* — Huan Le
(74) *Attorney, Agent, or Firm* — Morgan, Lewis & Bockius LLP

(57) ABSTRACT

Disclosed is a method of diagnosing a malfunction in a dual clutch transmission (DCT) attributable to a gear synchromesh failure, without an output shaft speed sensor. The method includes: calculating, a difference (referred to as a first difference) between a first input shaft speed and the product of a wheel speed and a first gear ratio; a difference (referred to as a second difference) between a second input shaft speed and the product of a wheel speed and a second gear ratio; diagnosing a first input shaft as having a transmission gear synchromesh failure when the first difference is greater than a first reference value and the second difference is equal to or smaller than a second reference value; and performing control such that a gear shifting operation is performed using only a second input shaft when the first input shaft is diagnosed as having a transmission gear synchromesh failure.

6 Claims, 2 Drawing Sheets

(52) U.S. Cl.
CPC ............... *F16H 2061/1216* (2013.01); *F16H 2061/1224* (2013.01); *F16H 2061/1272* (2013.01); *F16H 2061/1284* (2013.01)

(56) References Cited

U.S. PATENT DOCUMENTS

2008/0236317 A1* 10/2008 Matsushita ............. F16H 61/12
 74/340
2014/0244121 A1* 8/2014 Nemoto ................. F16H 61/68
 701/58

FOREIGN PATENT DOCUMENTS

| KR | 10-1999-0058562 A | 11/2000 |
| KR | 10-1445040 B1 | 9/2014 |

* cited by examiner

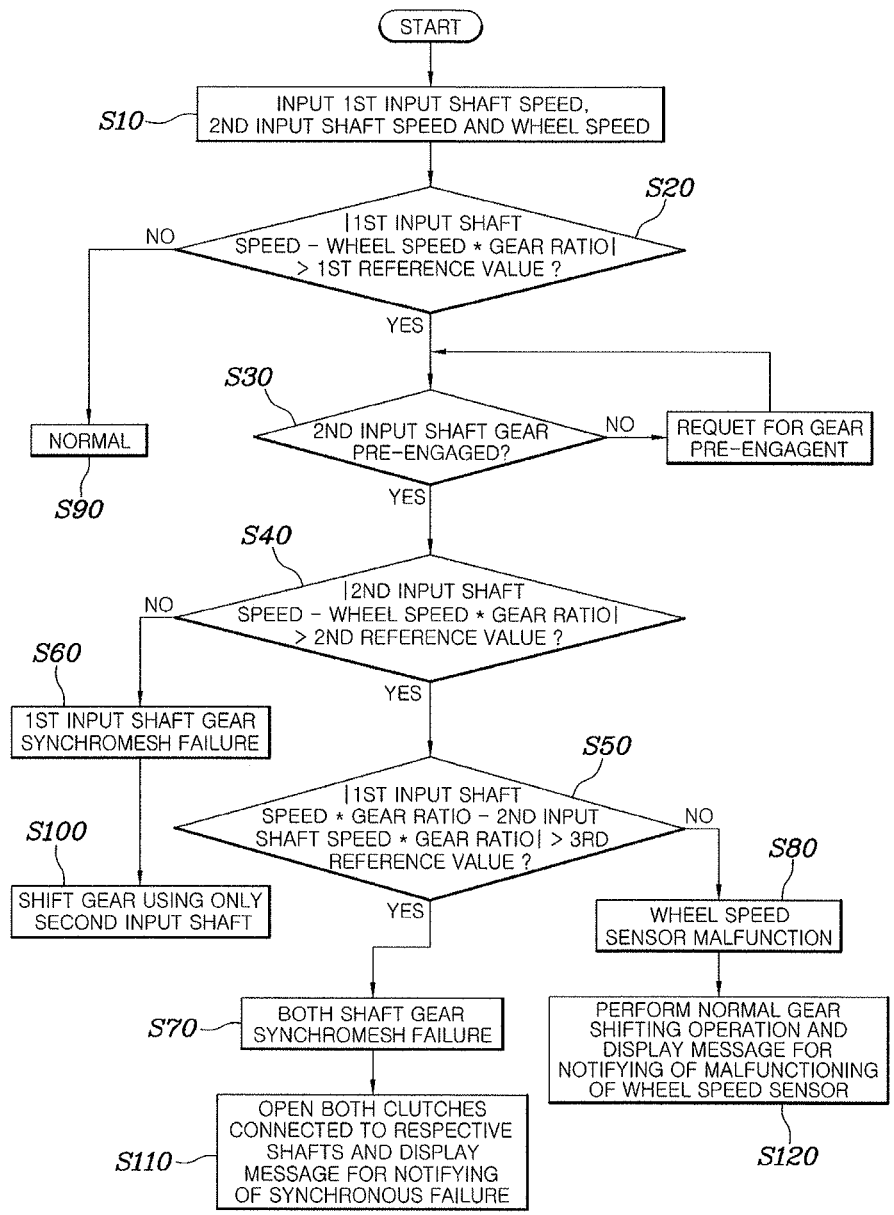

METHOD OF DIAGNOSING MALFUNCTION IN DUAL CLUTCH TRANSMISSION

CROSS REFERENCE TO ELATED APPLICATION

The present application claims priority of Korean Patent Application Number 10-2014-0161318 filed on Nov. 19, 2014, the entire contents of which application are incorporated herein for all purposes by this reference.

BACKGROUND OF THE INVENTION

Field of the Invention

The present invention relates to a method of diagnosing a malfunction in a transmission due to a synchromesh failure in a vehicle equipped with a dual clutch transmission (DCT).

Description of the Related Art

Recently, significant development has been made in automated manual transmissions, such as a dual clutch transmission (DCT), so as to realize the driving comfort of automatic transmissions and the high fuel efficiency and the high power efficiency of manual transmissions.

A DCT is a system which is based on a manual transmission but provides an operation mode in which the operation of a clutch and the change of a gear ratio are automated. These operations are enabled using an actuator that is driven by oil pressure or with a motor.

FIG. 1 schematically illustrates a partial configuration of a power train of a vehicle equipped with a DCT. Referring to FIG. 1, a first input shaft speed sensor 1 and a second input shaft speed sensor 3 are respectively provided on a first input shaft and a second input shaft, and an output shaft speed sensor 5 is provided on an output shaft. With these parts, it is possible to diagnose a synchromesh failure in a gear that is to form a shifting position.

A gear synchromesh failure in either the first input shaft or the second input shaft is diagnosed by comparing the output shaft speed produced based on the first input shaft speed and the output shaft speed produced based on the second input shaft speed.

However, this approach necessarily requires an output shaft speed sensor in order to diagnose a malfunction attributable to the gear synchromesh failure.

In this case, it may be required to diagnose a malfunction in the transmission using a wheel speed sensor. However, since the wheel speed sensor receives a signal from a chassis control unit via controller area network (CAN) communication, a transmission control unit (TCU) is unaware of the state of the reliability of the diagnosis. Accordingly, it is difficult to diagnose a malfunction in the transmission using only the signal that is input from the wheel speed sensor.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to propose a method of diagnosing a malfunction in a dual clutch transmission (DCT), attributable to a gear synchromesh failure, without using an output shaft speed sensor, and improving the reliability of the result of the malfunction diagnosis.

In order to achieve the above objective, according to one aspect of the present invention, there is provided a method of diagnosing a malfunction in a DCT, the method including: calculating a difference (hereinafter, referred to as a first difference) between a first input shaft speed and the product of a wheel speed and a first gear ratio; calculating a difference (hereinafter, referred to as a second difference) between a second input shaft speed and the product of a wheel speed and a second gear ratio; diagnosing a first input shaft as having a transmission gear synchromesh failure when the first difference is greater than a first reference value and the second difference is equal to or smaller than a second reference value; and performing control such that a gear shifting operation is performed by using only a second input shaft when the first input shaft is diagnosed as having a transmission gear synchromesh failure.

The method may further include: calculating a difference (hereinafter, referred to as a third difference) between the product of the first input shaft speed and a corresponding transmission gear ratio and the product of the second input shaft speed and a corresponding transmission gear ratio when the first difference is greater than the first reference value and when the second difference is greater than the second reference value; diagnosing both the first input shaft and the second input shaft as having a transmission gear synchromesh failure when the third difference is greater than a third reference value; and performing control such that both clutches respectively connected to the first input shaft and the second input shaft are opened to stop a vehicle and a warning message for notifying of a transmission gear synchromesh failure is displayed when both the first input shaft and the second input shaft are diagnosed as having a transmission gear synchromesh failure.

The method may further include: diagnosing a wheel speed sensor as malfunctioning when the third difference is equal to or smaller than the third reference value; and performing control such that a normal gear shifting operation is performed using both the first input shaft and the second input shaft and a warning message for notifying of malfunctioning of the wheel speed sensor is displayed when the wheel speed sensor is diagnosed as malfunctioning.

The method may further include diagnosing neither the first input shaft nor the second input shaft as having a transmission gear synchromesh failure when the first difference is equal to or smaller than the first reference value.

The method may further include receiving a first input shaft speed, a second input shaft speed, and a wheel speed as inputs via a first input shaft speed sensor, a second input shaft speed sensor, and a wheel speed sensor, before calculating the first difference.

The method may further include determining whether a transmission gear pre-engagement of the second input shaft is performed after calculating the first difference and before calculating the second difference.

As set forth above, the present invention makes it possible to diagnose a transmission gear synchromesh failure using a wheel speed sensor that measures the vehicle speed without using an output shaft speed sensor and diagnose a malfunction in the wheel speed sensor in the process of diagnosing the transmission gear synchromesh failure. It is therefore possible to improve the reliability of the wheel speed sensor used for diagnosing a synchromesh failure and the reliability of the result of the malfunction diagnosis performed using the wheel speed sensor.

BRIEF DESCRIPTION OF THE DRAWINGS

The above and other objects, features and advantages of the present invention will be more clearly understood from the following detailed description when taken in conjunction with the accompanying drawings, in which:

FIG. 2 is a flowchart illustrating a method of diagnosing a malfunction in a DCT according to an exemplary embodiment of the present invention.

DETAILED DESCRIPTION OF THE INVENTION

Figure 1:
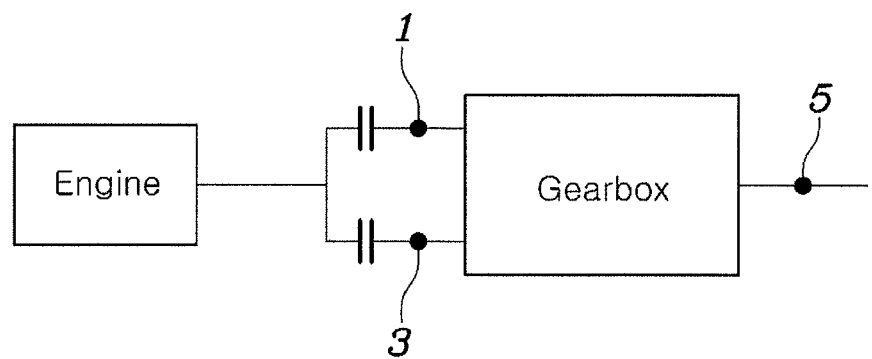
FIG. 1 is a view schematically illustrating the configuration of a part of a power train of a vehicle equipped with a DCT.

Reference will now be made in greater detail to an exemplary embodiment of the present invention, an example of which is illustrated in the accompanying drawings. Wherever possible, the same reference numerals will be used throughout the drawings and the description to refer to the same or like parts.

The method of diagnosing a malfunction in a DCT according to an exemplary embodiment of the present invention includes first calculation step S20, second calculation step S40, first malfunction diagnosis step S60, and first malfunction control step S100.

The method will be described in greater detail with reference to FIG. 2. At the first calculation step S20, the difference (hereinafter, referred to as first difference) between a first input shaft speed and the product of a wheel speed and a transmission gear ratio is calculated.

At input step S10 performed before the first calculation step S20, the first input shaft speed may be measured by a first input shaft speed sensor disposed on a first input shaft and then input into a control unit, for example, a transmission control unit (TCU), and the wheel speed may be measured by a wheel speed sensor and input into the TCU. The first difference may be an absolute value.

For example, when a pair of gears for forming a first shifting position are engaged with the first input shaft and the output shaft and rotate as a driving shaft, the first input shaft speed is calculated by multiplying the wheel speed with a first gear ratio.

Thus, the first input shaft speed calculated in this manner is compared with the first input shaft speed measured by the first input shaft speed sensor.

In this case, when the unit of a speed (vehicle speed) measured by the wheel speed sensor is different from the unit of the first input shaft speed, the rolling radius of the tire of the vehicle may be used in the calculation of the first input shaft speed in order to convert the units to be the same.

In addition, the method may also include determination step S30 between the first calculation step S20 and the second calculation step S40. At the determination step S30, it is determined whether or not a second input shaft is subjected to gear pre-engagement.

For example, in order to diagnose a transmission gear synchromesh failure caused by a synchronization device disposed on input shafts during the operation of the vehicle, the transmission gear is required to be pre-engaged with the second input shaft, i.e. a released shaft in the state in which power is being transferred through the first input shaft from the engine, by means of the synchronization device. Subsequently, the second input shaft functions as a driving shaft through DCT shifting. In this manner, the second calculation step S40 that will be described later can be carried out.

At the second calculation step S40, the difference (hereinafter, referred to as second difference) between a second input shaft speed and the product of a wheel speed and a transmission gear ratio is calculated.

At the input step S10 performed before the second calculation step S20, the second input shaft speed may be measured by a second input shaft speed sensor disposed on the second input shaft and input into the TCU. The second difference may be an absolute value.

For example, when a pair of gears for forming a second shifting position are engaged with the second input shaft and the output shaft and rotate as a driving shaft, the second input shaft speed is calculated by multiplying the wheel speed with a second gear ratio.

Thus, the second input shaft speed calculated in this manner is compared with the second input shaft speed measured by the second input shaft speed sensor.

At the first malfunction diagnosis step S60, when the first difference calculated at the first calculation step S20 is greater than a first reference value and the second difference calculated at the second calculation step S40 is equal to or smaller than a second reference value, the first input shaft is diagnosed as having a transmission gear synchromesh failure.

At the first malfunction control step S100, when the first input shaft is diagnosed as having a transmission gear synchromesh failure, control is performed such that a gear shifting operation is performed by using only the second input shaft.

Each of the first reference value and the second reference value is a tolerance between an input shaft speed measured by the input shaft speed sensor and an input shaft speed value reversely calculated based on a wheel speed measured by the wheel speed sensor. The first reference value and the second reference value may be set equal.

According to the above-described configuration, when the first difference calculated at the first calculation step S20 is greater than the first reference value, the synchronization device engaged with the first input shaft may be suspected of having a transmission gear synchromesh failure. When the second difference calculated at the second calculation step S40 is equal to or smaller than the second reference value, it is assumed that the wheel speed sensor is normally sensing the wheel speed. Accordingly, it is diagnosed as a malfunction due to the transmission gear synchromesh failure of the first input shaft.

In addition, the method according to this embodiment may further include normality diagnosis step S90 of diagnosing both the first input shaft and the second input shaft as being normal when the first difference calculated at the first calculation step S20 is equal to or smaller than the first reference value.

The method according to this embodiment may further include third calculation step S50, second malfunction diagnosis step S70, third malfunction diagnosis step S80, second malfunction control step S110, and third malfunction control step S120.

At the third calculation step S50, when the first difference calculated at the first calculation step S20 is greater than the first reference value and the second difference calculated at the second calculation step S40 is greater than second reference value, the difference (referred as third difference) between the product of the first input shaft speed and a corresponding transmission gear ratio and the product of the second input shaft speed and a corresponding transmission gear ratio is calculated.

For example, the output at the output shaft may be calculated by multiplying the first input shaft speed with the transmission gear ratio of the pair of gears connected to the first input shaft. The output at the output shaft may be calculated by multiplying the second input shaft speed with the transmission gear ratio of the pair of gears connected to the second input shaft.

Consequently, at the second malfunction diagnosis step S70, when the third difference calculated at the third calculation step S50 is greater than the third reference value, both the first input shaft and the second input shaft are diagnosed as having a transmission gear synchromesh failure.

Subsequently, at the second malfunction control step S110, when both the first input shaft and the second input shaft are diagnosed as having the second transmission gear synchromesh failure, both the clutches respectively connected to the first input shaft and the second input shaft are opened, so that power from the engine is not transferred to the output shaft and then the vehicle is consequently stopped, and a warning message for notifying of the transmission gear synchromesh failure is displayed.

Specifically, in the state in which the transmission gears are engaged with the first input shaft and the second input shaft, when there is no transmission gear synchromesh failure, the output produced using the first input shaft speed and the output produced using the second input shaft speed must be substantially equal within a tolerance.

When the transmission gears of either the first input shaft or the second input shaft have a synchromesh failure, the input shaft speed of the input shaft having a synchromesh failure may be slower than the input shaft speed measured at the normal state. Consequently, the output produced using the first input shaft speed is different from the output produced using the second input shaft speed.

Therefore, when the difference (i.e. third difference) between the output produced using the first input shaft speed and the output produced using the second input shaft speed is greater than the third reference value, not only the first input shaft but also the second input shaft is diagnosed as having a transmission gear synchromesh failure.

At the third malfunction diagnosis step S80, when the third difference calculated at the third calculation step S50 is equal to or smaller than the third reference value, the wheel speed sensor is diagnosed as malfunctioning.

Subsequently, at the third malfunction control step S120, when the wheel speed sensor is diagnosed as malfunctioning, a normal gear shifting operation is performed using both the first input shaft and the second shaft, and a warning message for notifying of malfunctioning of the wheel speed sensor is displayed.

When there is no transmission gear synchromesh failure, the output produced using the first input shaft speed is substantially equal to the output produced using the second input shaft speed within a tolerance. In this case, the wheel speed sensor is diagnosed as malfunctioning rather than the transmission gears.

Although the exemplary embodiments of the present invention have been described for illustrative purposes, those skilled in the art will appreciate that various modifications, additions and substitutions are possible, without departing from the scope and spirit of the present invention as disclosed in the accompanying claims.

What is claimed is:

1. A method of diagnosing a malfunction in a dual clutch transmission, the method comprising:
   calculating a first difference between a first input shaft speed and a first product of a wheel speed and a first gear ratio;
   calculating a second difference between a second input shaft speed and a second product of a wheel speed and a second gear ratio;
   diagnosing a first input shaft as having a first transmission gear synchromesh failure when the first difference is greater than a first reference value and the second difference is equal to or smaller than a second reference value; and
   performing control such that a first gear shifting operation is performed using only a second input shaft when the first input shaft is diagnosed as having the first transmission gear synchromesh failure.

2. The method according to claim 1, further comprising:
   calculating a third difference between a third product of the first input shaft speed and a first corresponding transmission gear ratio and a fourth product of the second input shaft speed and a second corresponding transmission gear ratio when the first difference is greater than the first reference value and the second difference is greater than the second reference value;
   diagnosing both the first input shaft and the second input shaft as having a second transmission gear synchromesh failure when the third difference is greater than a third reference value;
   performing control such that both of the clutches respectively connected to the first input shaft and the second input shaft are opened to induce stopping of a vehicle and a warning message for notifying of the second transmission gear synchromesh failure is displayed when both the first input shaft and the second input shaft are diagnosed as having the second transmission gear synchromesh failure.

3. The method according to claim 2, further comprising:
   diagnosing a wheel speed sensor as malfunctioning when the third difference is equal to or smaller than the third reference value; and
   performing control such that a second gear shifting operation is performed using both the first input shaft and the second input shaft and a warning message for notifying of the malfunctioning of the wheel speed sensor is displayed when the wheel speed sensor is diagnosed as the malfunctioning.

4. The method according to claim 1, further comprising, diagnosing neither the first input shaft nor the second input shaft as having the first transmission gear synchromesh failure when the first difference is equal to or smaller than the first reference value.

5. The method according to claim 1, further comprising receiving the first input shaft speed from a first input shaft sensor, the second input shaft speed from a second input shaft sensor, and the wheel speed from a wheel speed sensor before calculating the first difference.

6. The method according to claim 1, further comprising determining whether the second input shaft is pre-engaged with a transmission gear, after calculating the first difference and before calculating the second difference.

* * * * *